UNITED STATES PATENT OFFICE.

LUDWIG STRASSER, OF CHARLOTTENBURG, GERMANY.

ACCUMULATOR-ELECTRODE.

No. 894,238.  Specification of Letters Patent.  Patented July 28, 1908.

Application filed August 20, 1904. Serial No. 221,577.

*To all whom it may concern:*

Be it known that I, LUDWIG STRASSER, a subject of the King of Bavaria, chemist, and resident of Charlottenburg, near Berlin, Kingdom of Prussia, in the German Empire, have invented certain new and useful Improvements in Accumulator-Electrodes, of which the following is an exact specification.

In order to increase the conductivity of the active mass of accumulator electrodes it has been proposed to add retort carbon, coke, and graphite. The latter is further intended to be used in the form of scales to prevent the active mass from falling out of the perforated shell.

The applicant has now found that graphite in the form of scales is even surpassed by that form of carbon which is obtained by the carburation of organic substances (at high temperature) preferably cellulose, provided that the starting material, such, for example as paper and straw has a suitable form. This form of carbon has in the first place the advantage over the scale-graphite in being harder; therefore it retains better its original form during the treating and pressing of the paste. Further, it offers the possibility of giving the separate pieces of carbon any desired form, such for instance as thin plates or disks, or strips and threads and the like, such as are employed for electric incandescent lamps; by this form of carbon the conductivity and coherence of the active mass is improved as much as possible.

The improvement in conductivity by using strips and the like of the carbon is explained by the fact that a large number of particles of the comparatively ill conducting active material come into contact with the surface of a well conducting strip or thread of carbon, and by the fact that such threads fill the active mass with a net work of conductive material which gives a much better contact than is possible to get if scales of graphite are used, while it prevents the material from falling out through the small perforations in the metal shell.

Having now particularly described and ascertained the nature of my invention, what I desire to secure by Letters Patent of the United States is:—

An electrode for accumulators having an unchanging electrolyte, which electrode consists of active material of relatively poor conductivity and an admixture of a mass of particles of carbon which is the result of highly heating particles of organic substances having definite form adapted to produce contact and coherence throughout the mass, and the particles of carbon retaining the form of the particles of organic substances.

In testimony whereof I have signed my name to this specification in the presence of two subscribing witnesses.

LUDWIG STRASSER.

Witnesses:
HENRY HASPER,
WOLDEMAR HAUPT.